(12) United States Patent
Owen et al.

(10) Patent No.: US 12,236,166 B2
(45) Date of Patent: Feb. 25, 2025

(54) METHOD OF OPERATING A CAD SYSTEM MODEL FOR MODELLING AN ARTICLE TO BE MANUFACTURED

(71) Applicant: Siemens Industry Software Limited, Farnborough (GB)

(72) Inventors: John Caradog Owen, Cambridge (GB); Michael James Atkins, Cambridge (GB)

(73) Assignee: Siemens Industry Software Limited, Frimley (GB)

( * ) Notice: Subject to any disclaimer, the term of this patent is extended or adjusted under 35 U.S.C. 154(b) by 1141 days.

(21) Appl. No.: 16/960,925

(22) PCT Filed: Jan. 29, 2018

(86) PCT No.: PCT/EP2018/052076
§ 371 (c)(1),
(2) Date: Jul. 9, 2020

(87) PCT Pub. No.: WO2019/145048
PCT Pub. Date: Aug. 1, 2019

(65) Prior Publication Data
US 2021/0081583 A1    Mar. 18, 2021

(51) Int. Cl.
*G06F 30/17* (2020.01)
*G06F 17/16* (2006.01)
*G06F 30/12* (2020.01)

(52) U.S. Cl.
CPC .............. *G06F 30/12* (2020.01); *G06F 17/16* (2013.01)

(58) Field of Classification Search
CPC . G06T 17/20; G06T 19/20; G06T 2219/2021; G06F 17/16; G06F 2111/04; G06F 30/00; G06F 30/12
See application file for complete search history.

(56) References Cited

U.S. PATENT DOCUMENTS 6,307,555 B1 * 10/2001 Lee .................. G06T 17/20
                                                    345/441
9,396,292 B2    7/2016 Mattson
(Continued)

FOREIGN PATENT DOCUMENTS

CN          105144169 A     12/2015
EP             2833326 B1    4/2016
(Continued)

OTHER PUBLICATIONS

Narabu, Yusuke, et al. "Automatic manufacturing feature extraction of CAD models for machining." Key Engineering Materials 447 (2010): 287-291.*
(Continued)

*Primary Examiner* — Nithya J. Moll
(74) *Attorney, Agent, or Firm* — Wolter Van Dyke Davis, PLLC

(57) ABSTRACT

A method of operating a computer aided design system model for an article to be designed or manufactured, the method performed on a data processing system; the method includes in a CAD system model capable of representing an article as either algebraic geometry or facet geometry, receiving a mesh geometry representing a surface of the article in 3 dimensions. Constraints to be applied to the mesh geometry are received and the mesh geometry is solved as an exact surface. An updated model of the mesh geometry is stored.

16 Claims, 9 Drawing Sheets

(56) References Cited

U.S. PATENT DOCUMENTS

| | | | |
|---|---|---|---|
| 2001/0047251 A1 | 11/2001 | Kemp | |
| 2011/0276315 A1 | 11/2011 | Brookes | |
| 2013/0135302 A1* | 5/2013 | Bonner | G06T 17/30 |
| | | | 345/420 |
| 2014/0088925 A1* | 3/2014 | Owen | G06F 30/00 |
| | | | 703/1 |
| 2014/0184598 A1* | 7/2014 | Quilot | G06T 17/20 |
| | | | 345/423 |
| 2014/0184599 A1 | 7/2014 | Quilot et al. | |

FOREIGN PATENT DOCUMENTS

| | | |
|---|---|---|
| RU | 2541169 C2 | 2/2015 |
| WO | 2017041214 A1 | 3/2017 |

OTHER PUBLICATIONS

Kobbelt, Leif P., et al. "Feature sensitive surface extraction from volume data." Proceedings of the 28th annual conference on Computer graphics and interactive techniques. 2001.*

Hughes, Thomas JR, John A. Cottrell, and Yuri Bazilevs. "Isogeometric analysis: CAD, finite elements, NURBS, exact geometry and mesh refinement." Computer methods in applied mechanics and engineering 194.39-41 (2005): 4135-4195.*

Kiendl, Josef, et al. "Isogeometric shell analysis with Kirchhoff-Love elements." Computer methods in applied mechanics and engineering 198.49-52 (2009): 3902-3914.*

PCT International Search Report and Written Opinion of International Searching Authority mailed Oct. 4, 2018 corresponding to PCT International Application No. PCT/EP2018/052076 filed Jan. 29, 2018.

* cited by examiner

METHOD OF OPERATING A CAD SYSTEM MODEL FOR MODELLING AN ARTICLE TO BE MANUFACTURED

CROSS REFERENCE TO RELATED APPLICATIONS

This application is the US National Stage of International Application No. PCT/EP2018/052076 filed 29 Jan. 2018, incorporated by reference herein in its entirety.

TECHNICAL FIELD

This present disclosure relates to the general field of computer aided design, drafting ("CAD"), manufacturing ("CAM") and visualisation systems (individually and collectively "CAD systems"), product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved methods and systems are desirable.

SUMMARY OF THE DISCLOSURE

Various disclosed embodiments include methods for modifying a computer aided design (CAD) system model in a modelling system.

A method of operating a computer aided design (CAD) system model, the method performed on a data processing system may comprise modifying a computer aided design (CAD) system model for an article to be designed or manufactured, the method performed on a data processing system; the method comprising in a CAD system model capable of representing an article as either algebraic geometry or facet geometry, receiving a mesh geometry representing a surface of the article in 3 dimensions; receiving constraints to be applied to the mesh geometry, solving the mesh geometry as an exact surface; and, storing an updated model of the mesh geometry.

A data processing system may include a processor; and an accessible memory, the data processing system particularly configured to carry out the steps, in a CAD system model capable of representing an article as either algebraic geometry or facet geometry, receiving a mesh geometry representing a surface of the article in 3 dimensions; receiving constraints to be applied to the mesh geometry, solving the mesh geometry as an exact surface; and, storing an updated model of the mesh geometry.

A non-transitory computer-readable medium encoded with executable instructions that, when executed, cause one or more data processing systems to perform a method of modifying a computer aided design (CAD) system model, the method performed on a data processing system, the method comprising in a CAD system model capable of representing an article as either algebraic geometry or facet geometry, receiving a mesh geometry representing a surface of the article in 3 dimensions; receiving constraints to be applied to the mesh geometry, solving the mesh geometry as an exact surface; and, storing an updated model of the mesh geometry.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

An example of method and system according to the present disclosure will now be described with reference to the accompanying drawings in which.

DETAILED DESCRIPTION

Figure 1:
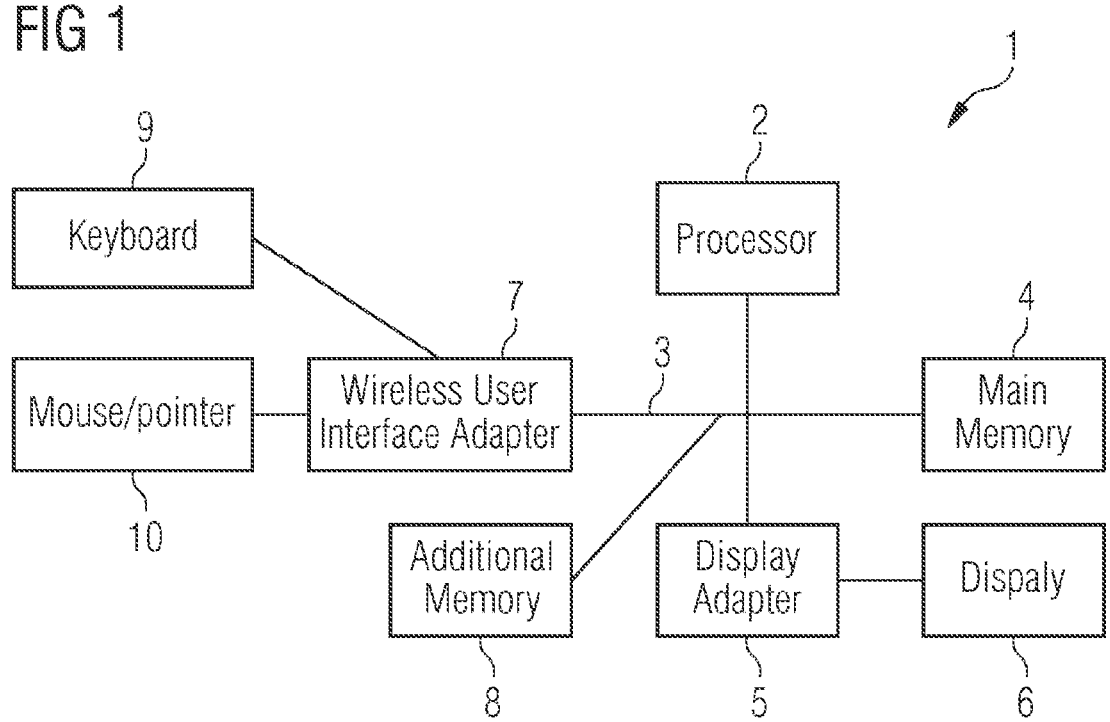
FIG. 1 is a block diagram of a data processing system in which an embodiment can be implemented.

The embodiments of FIGS. 1 to 18 used to describe the principles of the present disclosure in this document are by way of illustration only and should not be construed in any way to limit the scope of the disclosure. Those skilled in the art will understand that the principles of the present disclosure may be implemented in any suitably arranged device, apparatus, system, or method.

The method of the present disclosure may further comprise at least one of displaying an image of the updated mesh geometry; and generating a set of instructions for a computer controlled machine. This gives better control of the design process using the method of the present invention leads to designs for parts which are less likely to be unmanufacturable than may have previously been the case, saving time and effort, as well as cost. The constraints may comprise at least one of a geometry coincident to the mesh geometry; a distance dimension between a geometry and the mesh geometry; or a geometry touching the mesh geometry.

The solving may comprise a method of satisfying the received constraints by defining a solved position for each constraint and determining for each constraint a distance from that solved position and a first derivative vector of the distance for each constraint applied to the mesh geometry; and applying a change based on the determined distance and first derivative vector of the distance. The method defines the effect on the part to be manufactured in terms of distance and direction.

The method may further comprise selecting a sub-region of the received mesh geometry and performing the distance and first derivative calculations for the sub-region. This allows solving to a local minimum distance rather than to the global minimum distance. The sub region may be modified during the solve calculations, or it may not be modified.

There are many possible methods by which a sub-region may be defined, but the methods may include that the sub-region comprises one of that part of the received mesh geometry that lies within a sphere defined by a specified radius about a specified point; that lies within a rectangular box of a specified size and location; that lies within a region identified by an end-user sketching a closed loop on the mesh; that lies within a region of the mesh which is smooth; or that lies within a region that is bounded by edges.

The geometry may comprise one of a point, a curve, an algebraic surface, a facet surface, or a mesh geometry. The geometry may be bounded or unbounded. An unbounded geometry is one that extends to infinity. For example, a plane, a line with no endpoints. The constraints may be applicable between a point, a curve, an algebraic surface, a facet surface, another mesh geometry, and the received mesh geometry. The mesh geometry may comprise one or more points, curves, algebraic surfaces, or facet surfaces, or combinations thereof. A mesh geometry may be a single point, curve or surface, or a plurality of each, such as a point cloud, or any combination of the options.

The constraints may be received from an external source, extracted from a store, or inferred from the geometry in the model. The method may be an iterative method, as this allows for the influence of multiple constraints to be implemented. A method of manufacturing a part may comprise modelling the part in accordance with this disclosure, inputting the updated mesh geometry to a computer controlled machine and replicating the associated article in a material using the computer controlled machine.

FIG. 1 illustrates an example of a data processing system in which an embodiment of the present disclosure may be implemented, for example a CAD system configured to perform processes as described herein. The data processing system 1 comprises a processor 2 connected to a local system bus 3. The local system bus connects the processor to a main memory 4 and graphics display adaptor 5, which may be connected to a display 6. The data processing system may communicate with other systems via a wireless user interface adapter connected to the local system bus 3, or via a wired network, e.g. to a local area network. Additional memory 8 may also be connected via the local system bus. A suitable adaptor, such as wireless user interface adapter 7, for other peripheral devices, such as a keyboard 9 and mouse 10, or other pointing device, allows the user to provide input to the data processing system. Other peripheral devices may include one or more I/O controllers such as USB controllers, Bluetooth controllers, and/or dedicated audio controllers (connected to speakers and/or microphones). It should also be appreciated that various peripherals may be connected to the USB controller (via various USB ports) including input devices (e.g., keyboard, mouse, touch screen, trackball, camera, microphone, scanners), output devices (e.g., printers, speakers), or any other type of device that is operative to provide inputs or receive outputs from the data processing system. Further it should be appreciated that many devices referred to as input devices or output devices may both provide inputs and receive outputs of communications with the data processing system. Further it should be appreciated that other peripheral hardware connected to the I/O controllers may include any type of device, machine, or component that is configured to communicate with a data processing system. Further, systems may use other types of input devices to provide inputs for manipulating objects such as a mouse, pointer, touch pad, drawing tablet, track ball, joystick, keypad, keyboard, camera, motion sensing device that captures motion gestures, or any other type of input device capable of providing the inputs described herein.

In CAD systems, a user may wish to model a design for a product, or for a system comprising many parts, generate manufacturing instructions for manufacturing that product or parts, or make modifications to the design or manufacturing instructions. Conventionally models have either been classic boundary representation (B-rep) models made up of algebraic geometry, or facet models. With advances in manufacturing methods, in particular additive manufacturing, or 3D printing, models have been developed combining both types of geometric representations, known as hybrid models. In a hybrid model, the faces of a B-rep model can be algebraic geometries (Non-uniform rational basis spline (NURBS), plane, cylinder, torus, etc.) or faceted. These hybrid models may use digitally scanned models, CAE workflows or 3D printing facet models directly with traditional B-rep modelling operations, saving time and effort which was previously required to convert the facet models into algebraic CAD geometry. Additive manufacturing techniques mean that the products being manufactured are no longer limited to regular shapes that can be machined, such as blocks or cylinders, but allow for organic shapes, lattice structures, or smoothly undulating surfaces to be manufactured. These types of shape, structure, or surface are better represented by facets than by classical geometry. For 3D printing facet information is sent to a machine to make the product, or part.

These new manufacturing techniques enable improvements in design and manufacturing processes. For example, in aircraft design, or motor vehicle design, weight is important, so replacing heavy boxy components with lightweight lattices or organic shapes is desirable. The designs aim to maintain strength, whilst reducing total weight, but they must still be able to be fitted to and operate with other components of the aircraft or vehicle which may not have been changed.

Geometric constraints and dimensions (collectively "constraints") are an essential part of modern CAD systems. Constraints allow the size and shape of individual components to be specified, and also allow for the relative positioning of multiple components. Constraints may be of many different types, for example, relating to the size, shape, or orientation of parts of an assembly that is being modelled. Any changes to one part of a system to be manufactured that is being worked on in the design model may need to take account of other parts of the system that they must fit to, or work with. These relationships can be represented with constraints.

For all design modifications to a model, whether a complete product or only a small part of a product, the result needs to be correctly sized and positioned with respect to any other products or parts that it will work with. For example, it may be desirable to reduce the thickness of a part in order to reduce its weight, while still ensuring that it fits exactly between two other parts. It is possible to control the thickness of a part by using a distance dimension between two faces. At the same time, touching constraints can be applied to other faces to ensure that the required relationships to other parts are maintained.

However, the problem of applying constraints in hybrid models has not been addressed. For purely facetted models, conventionally, in order to apply constraints onto facetted surfaces, it was necessary to convert to an algebraic geometry, for example by approximating the facetted surface with a B-spline surface. However, this may give rise to undesirable wiggles, or undulations, in the surface. If these are not perceptible until a later stage in the design process, it may result in unnecessary rework. The present disclosure provides a method of allowing constraints and dimensions to be used on such a hybrid model without conversion. The method allows a constraint applied to a facetted surface of a hybrid model to be solved exactly, avoiding the additional wiggles, or undulations, that might come into the approximation, if conventional techniques were to be used.

The present disclosure provides a method of interpreting mesh geometry, so that it can still be solved in a CAD system when constraints are applied. For the purpose of this application, simplified examples have been provided, but in practice the example mesh of FIG. 2 may represent a complete product to be manufactured, or only a small part of a much larger system. Various types of mesh geometry may be supported by the method, including a surface defined by planar facets, a collection of surfaces with any geometry type (e.g. a general sheet body), a non-manifold mesh, a self-intersecting mesh, a mesh with symmetries (e.g. swept), point clouds, or a non-rigid mesh. The examples described below may be applied to any of these types of mesh geometry.

One typical example of a mesh type to which the method of the present disclosure may be applied is a surface made up of planar facets defined by the facet vertices. The facet edges, i.e. the lines joining the facet vertices, may be interior edges, if they bound more than one facet, or exterior edges, if they bound a single facet. Typically, the mesh is a rigid mesh, although there will be applications for non-rigid meshes. A rigid mesh has a defined shape which cannot change. However, the position of the mesh may change, so constraints may be used to position the mesh in relation to other geometry. For some practical applications, such as designing for additive manufacturing, the mesh needs to be a manifold mesh, having a positive and negative side and facet normals which are consistent across adjacent facets. However, the method may be applied to a non-manifold mesh, or a self-intersecting mesh.

Figure 2:
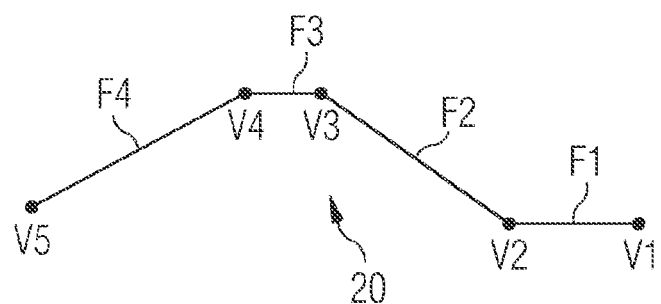
FIG. 2 illustrates a 2D representation of an example of a mesh representing a surface of an article that is being modelled according to the method of this disclosure.

FIG. 2 illustrates a 2D representation of an example of a rigid facet mesh 20 representing a surface of an article that is being modelled. A mesh is typically a surface defined by planar facets, but the method applies to any collection of faces, whether connected faces, connected along a common edge, or disconnected faces. The representation comprises a series of facets F1 to F4 and vertices V1 to V5. Vertices V2 to V4 are interior facet vertices. Vertices V1 and V5 are exterior facet vertices. Constraints to be applied to the mesh are typically geometric relationships, for example a relationship such as a point coincident to the mesh, a distance dimension between a point and the mesh, a plane touching the mesh, or a distance dimension between a plane and the mesh. The facet geometry representation, or mesh 20, as received in the model may have been scanned from an existing product that is in need of updating or repair, or may have been generated as part of an earlier step in the design process for example, using given strength requirements and approximate shape to generate a design representation of the article, which may be manufactured when the design process is complete.

A number of different types of constraints between a point and a mesh may be applied, for example, a coincident constraint, a distance dimension, or a signed distance dimension to the mesh.

A coincident constraint between a point P and a mesh is solved when the point lies on the mesh. This type of constraint can be used to represent the requirement in a model of an article to be manufactured that a point in one part is coincident with a mesh in another part. There may be many similar constraints in a model which are used to specify the size, shape or orientation of each part. The solution may be on a facet interior, facet edge or facet vertex. If the point does not start out on the mesh and there are no other constraints on the point, then the desired solution is the closest position on the mesh. If there is no unique closest position then the behaviour is specified, so that there is a repeatable way of choosing a solution. There are many options for specifying the behaviour, examples of which are to choose the position nearest to the origin, choose the position nearest to the centroid of the mesh, or to choose the position nearest to a location picked by the engineer.

Figure 3:
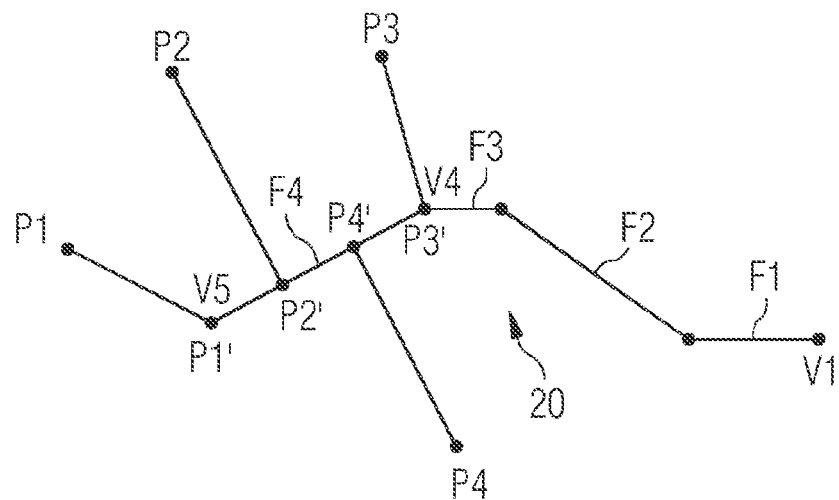
FIG. 3 illustrates using the method to apply coincident constraints to points for the mesh of FIG. 2.

FIG. 3 illustrates a number of points P1 to P4 and the 2D representation of the facet mesh of FIG. 2. Applying coincident constraints between the mesh and those points P1 to P4 gives corresponding solution points P1' to P4' where the points solve on the mesh as shown. Point P1 solves to P1', on the exterior vertex V5, point P2 solves to P2', on a facet interior of facet F4, point P3 solves to P3', on the interior vertex V4 and point P4 solves to P4' on a facet interior of facet F4. As P4 is equidistant from two facets F4 and F2, a consistent method of getting the same solution on each solve is required, as described above, such as choosing the position nearest to the origin, choosing the position nearest to the centroid of the mesh, or choosing the position nearest to a location picked by the engineer.

A distance dimension between a point Pn and a mesh is solved when the global closest approach between the point and the mesh is equal to the distance value, i.e. when the minimum distance from the point to the mesh is equal to the value of the dimension. This type of constraint can be used to represent the requirement in a model to be manufactured of a specified thickness at any location on the surface, for example where this is needed to achieve a given strength, or to maintain a gap between a point and the mesh surface in order that the manufactured model can be fitted together.

Figure 4:
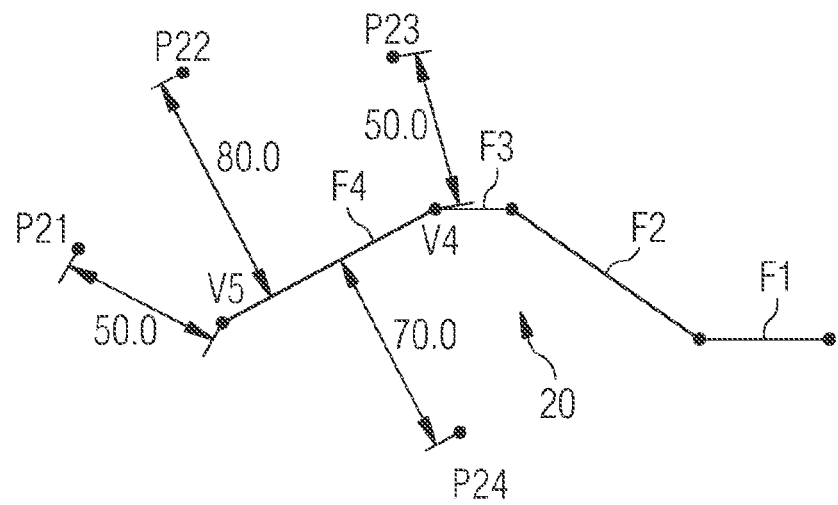
FIG. 4 shows a 2D representation of various distance dimensions between points and the mesh of FIG. 2.

FIG. 4 shows a 2D representation of various distance dimensions between points and the mesh of FIG. 2. As FIG. 4 is a 2D representation of a 3D facet surface, and if a point has a distance dimension to a 3D facet surface then the point will be solved to a sphere centred on a facet vertex, a cylinder centred on a facet edge or a plane parallel to a facet interior. In this model point P21 is on a sphere, represented in the figure by an arc, centred at the end facet vertex V5 and has distance dimension 50. Point P22 is on a plane, represented in the figure by a line parallel to the facet interior, F4 and has a distance dimension 80. Point P23 is on an arc centred at the interior facet vertex V4 and has a distance dimension 50; and point P24 has a distance dimension 70 and is equidistant from two facets, F4 and F2.

Figure 5:
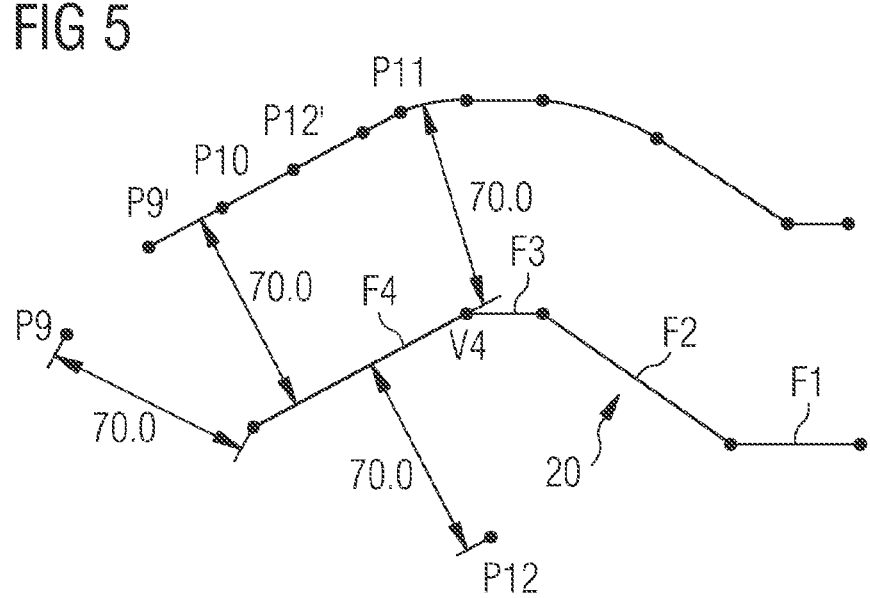
FIG. 5 illustrates the locus of points which are a distance dimension from the mesh of FIG. 2, when a side has been specified.

If the mesh is manifold, then it is possible, but not required, to specify a side of the mesh on which the point lies. A manifold mesh can be used to represent a face of a solid part where one side of the mesh is inside the solid and the other side is outside the solid. If the dimension is used to specify the gap between two solid parts then specifying the side ensures that the parts will be separated rather than interpenetrating. FIG. 5 shows the locus of points which are a distance dimension of 70 from the mesh 20 when a side has been specified. P10 and P11 are examples of solved points which lie on this locus. P9 and P12 are not valid solved positions, as P12 would solve to P12' to the other side of the mesh and P9 would solve to P9'.

A number of different types of constraints may be applied between a plane and a mesh, for example, touching constraints, touching constraints with a half space specified and distance dimensions. Lines are used to represent planes in the figures, in the same way that a polyline (as in FIG. 2) is meant to represent a mesh surface.

Figure 6:
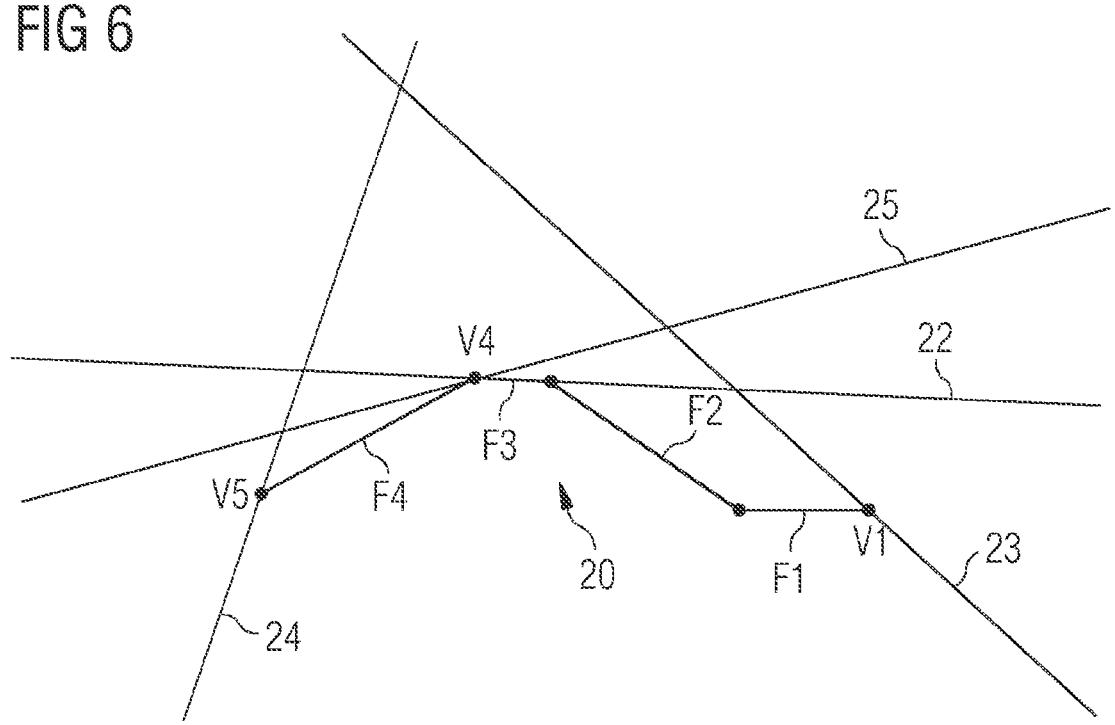
FIG. 6 shows some examples of solved touching constraints between 2D representations of planes and the mesh of FIG. 2.

A touching constraint between a plane and a mesh is defined to mean that the minimum global closest approach between the plane and the mesh is zero and that all the mesh geometry is on the same side of the unbounded plane. This type of constraint can be used to ensure that two parts are manufactured to the correct size so that a planar face of one part is touching a mesh face of another part. It may also be used to control the positions of two parts in an assembly. FIG. 6 shows some examples of solved touching constraints between planes, represented with lines 22, 23, 24, 25 and the mesh 20. For example line 22 may be said to be touching the mesh 20 along facet F3, whereas line 23 touches only the exterior vertex V1, line 24 touches only the exterior vertex V5 and line 25 touches the interior vertex V4. If in the starting position the mesh 20 lies on both sides of the plane a solution is found that minimises the plane movement. That is, the plane moves to the "nearest" solution. Similarly, if in the starting position the mesh lies completely on one side of the plane the solution will be found where it is still on the same side. For example, in FIG. 8 the minimum distance between the plane L9 and the mesh 20 is zero, but portions of the mesh lie on both sides of the plane, so the constraint is not solved. To find a solution, the plane could be moved along its normal direction either up and to the right, or down and to the left, so typically the up and right solution would be chosen because this requires a smaller movement.

Figure 7:
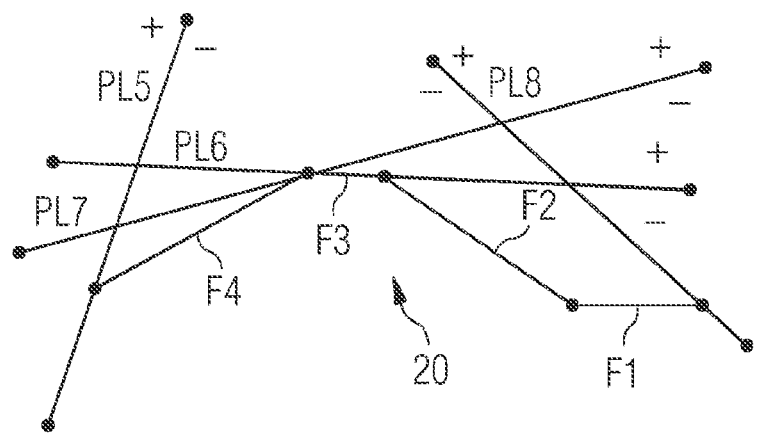
FIG. 7 shows some examples of touching constraints between 2D representations of planar half spaces and the mesh of FIG. 2.

A touching constraint between a planar half space and a mesh gives a definition that can optionally also specify which side of a plane the mesh will be. For a planar half space, touching a mesh means that the minimum global closest approach between the plane and the mesh is zero and that all the mesh geometry is on the specified side of the plane. FIG. 7 shows some examples of touching constraints between planes PL5, PL6, PL7, PL8 (represented with bounded lines) and a mesh 20 and is similar to FIG. 6. In all cases the touching is specified to be on the negative side of the plane.

Figure 10:
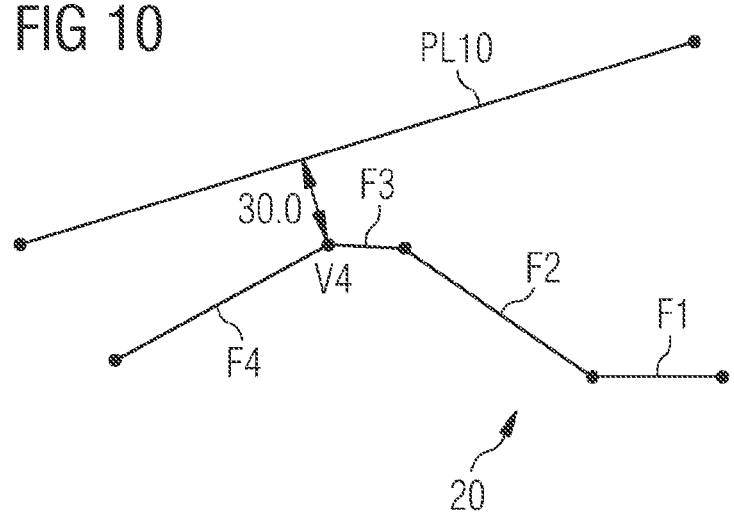
FIG. 10 illustrates one example of a distance dimension created between a plane and the mesh of FIG. 2.

A distance dimension between a plane and a mesh is defined to mean that the minimum global closest approach between the plane and the mesh is equal to the value of the distance dimension and that all the mesh geometry is on the same side of the unbounded plane. Such a dimension could be used to control the thickness of a part by specifying the distance between a mesh face and a planar face. It may also be used to control the sizes or positions of two parts by specifying the gap between them. FIG. 10 illustrates an example of this, showing details of a dimension between a plane and a mesh, with plane PL10 coming no closer than distance 30 at vertex V4 to the mesh 20 comprising facets F1 to F4.

The definitions given for points and planes can be used to specify the definitions of other types of constraints and dimensions between a mesh and any other type of geometry, including another mesh. For example, a touching constraint between a sphere and a mesh may be derived from a distance dimension to a point. The value of the distance dimension is the radius of the sphere and the point gives the position of the centre of the sphere. Similarly, a distance dimension between a mesh and a mesh may be derived from a plane-mesh distance, such that the dimension is solved when the global minimum distance between the two meshes is the same as the value of the distance dimension.

Figure 8:
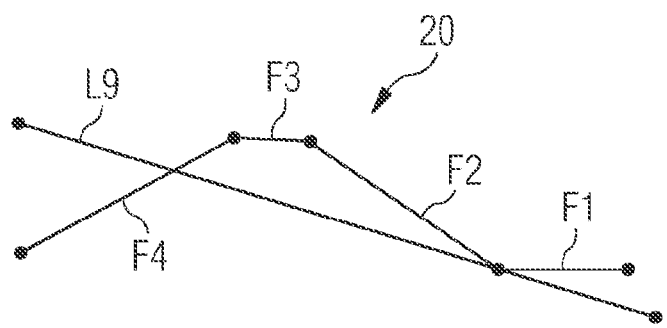
FIG. 8 illustrates touching between a plane and a mesh of FIG. 2.
Figure 9:
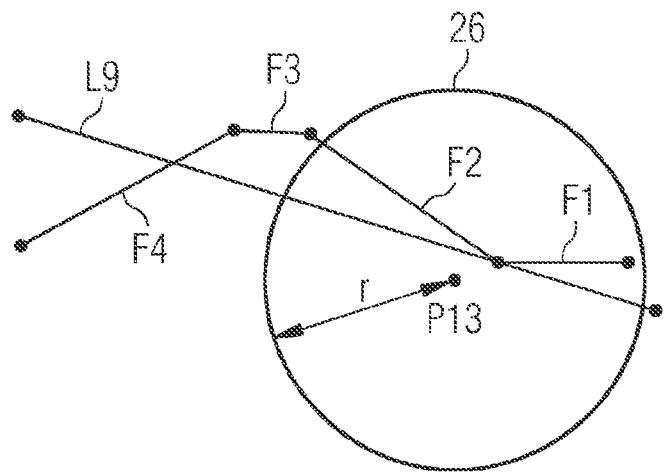
FIG. 9 illustrates the use of help sphere to solve the example of FIG. 8.

In the descriptions above, all constraints are solved by using the entire mesh. In some cases, this means that desirable solutions are not possible. For example, FIG. 8 shows a plane and a mesh. However, this solution is not possible with a touching constraint because although the plane touches the mesh at one location, it also intersects it at another location. To allow solutions such as this, the definition of the constraint can be enhanced to specify a subset of the entire mesh. FIG. 9 shows one way that this can be done, by a "help sphere" 26 which is defined by a position, point P13 and a radius, r, so that only the parts of the mesh which are inside this sphere 26 are considered when solving the constraint. An example of where this would apply is on a surface which has concave and convex regions, giving a bumpy surface, rather than a smooth one. From FIG. 9 it can be seen that the point P13 need not be coincident with the mesh 20. In addition to allowing localised solutions, this also may also improve performance.

Figure 11:
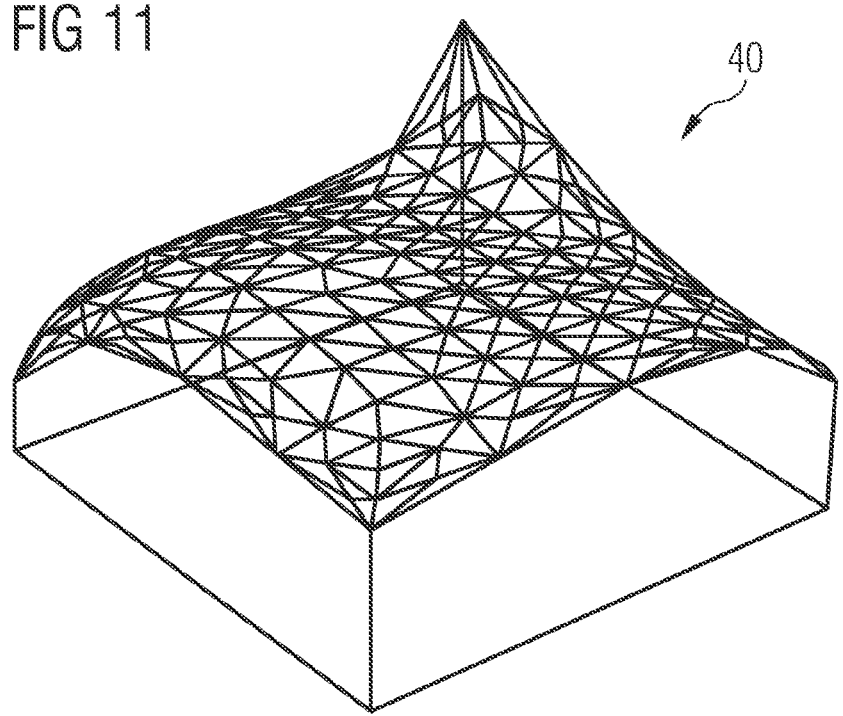
FIG. 11 illustrates an example of a hybrid part to which the method of the present disclosure may be applied.
Figure 12:
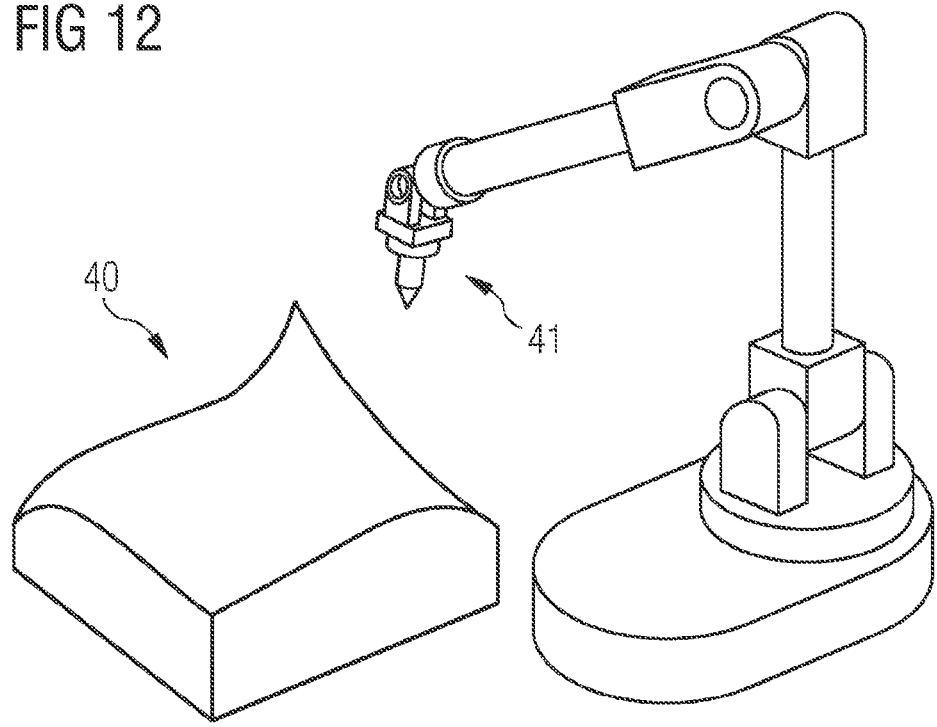
FIG. 12 shows a model of the hybrid part of FIG. 11 with a device, such as a measuring probe or cutter.
Figure 13:
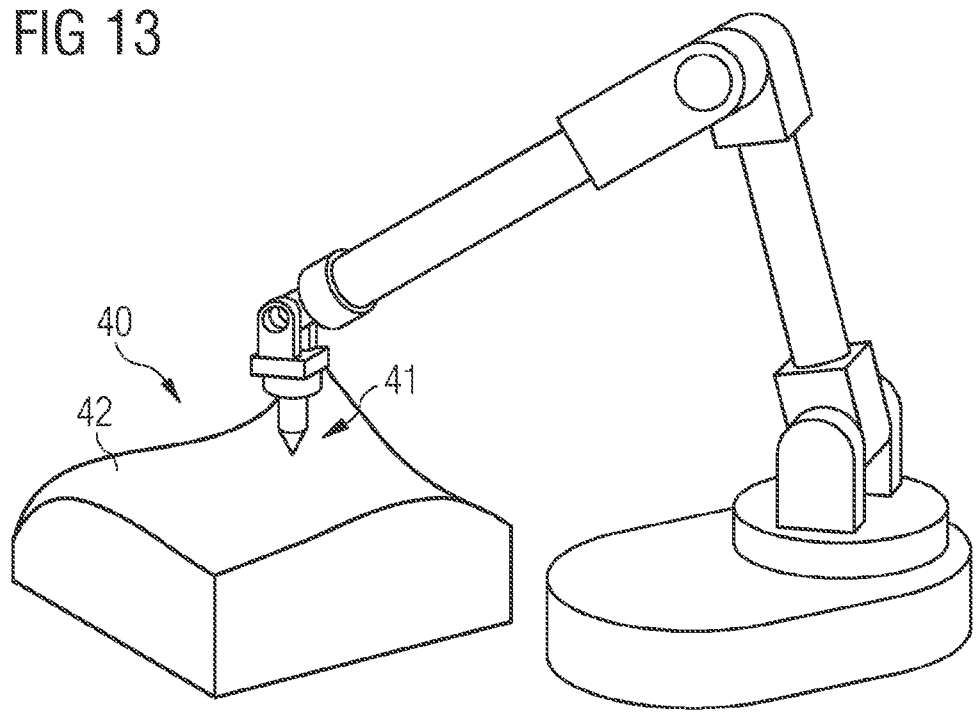
FIG. 13 illustrates the same model as in FIG. 12, where the probe or cutter is coincident with the faceted face of the hybrid part of FIG. 11.

Some more practical examples of the present disclosure are set out below. FIG. 11 illustrates an example of a hybrid part 40. During production, this hybrid part interacts with, for example a measuring probe, or cutter 41, which can also be modelled as shown in FIG. 12. The measuring probe or cutter 41, at some point in its use approaches the hybrid part 40 and may be coincident with the faceted face 42 of the hybrid part, as shown in FIG. 13. This is an example of the application of a touching constraint, for example as described with respect to FIG. 6 or FIG. 7, which also requires the other geometry, in this case the probe or cutter 41, to be on a specified side of the mesh, in this case the hybrid part 40.

Figure 14:
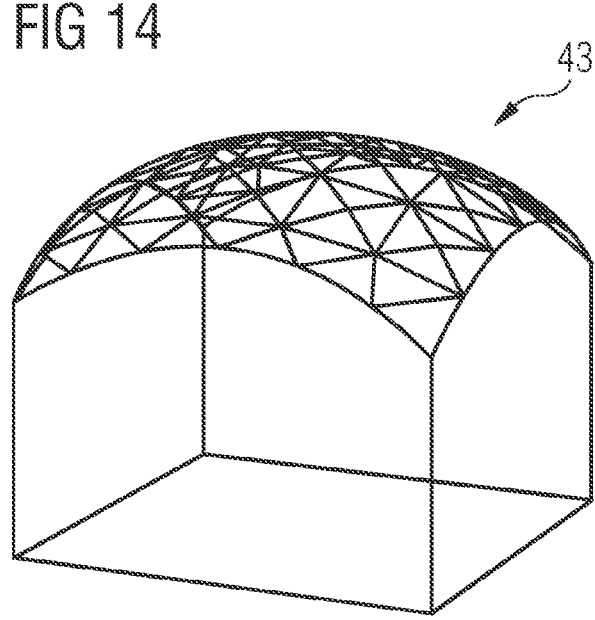
FIG. 14 illustrates an example of another hybrid part to which the method of the present disclosure may be applied.
Figure 15:
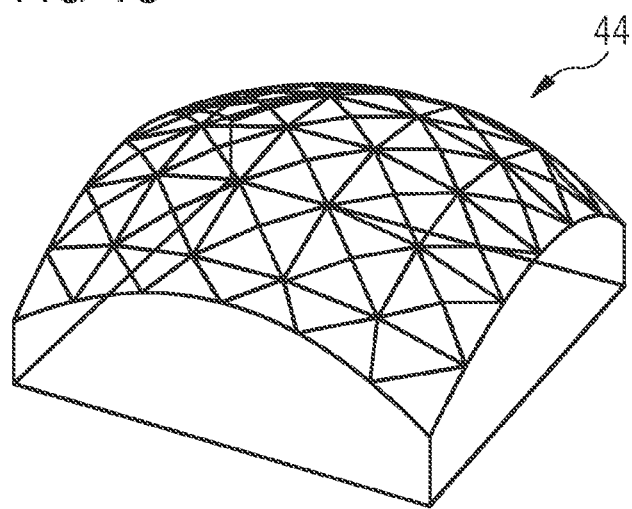
FIG. 15 shows a thinner version of the part of FIG. 14.
Figure 16:
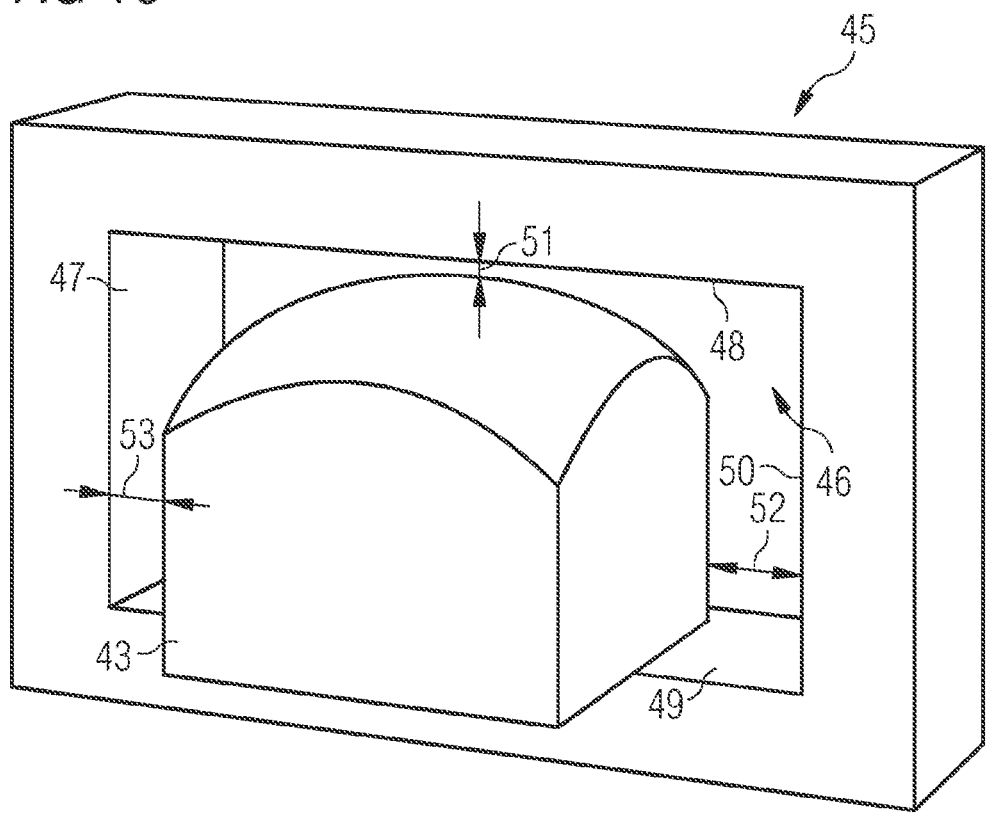
FIG. 16 illustrates the hybrid part of FIG. 14 fitted in an assembly.
Figure 17:
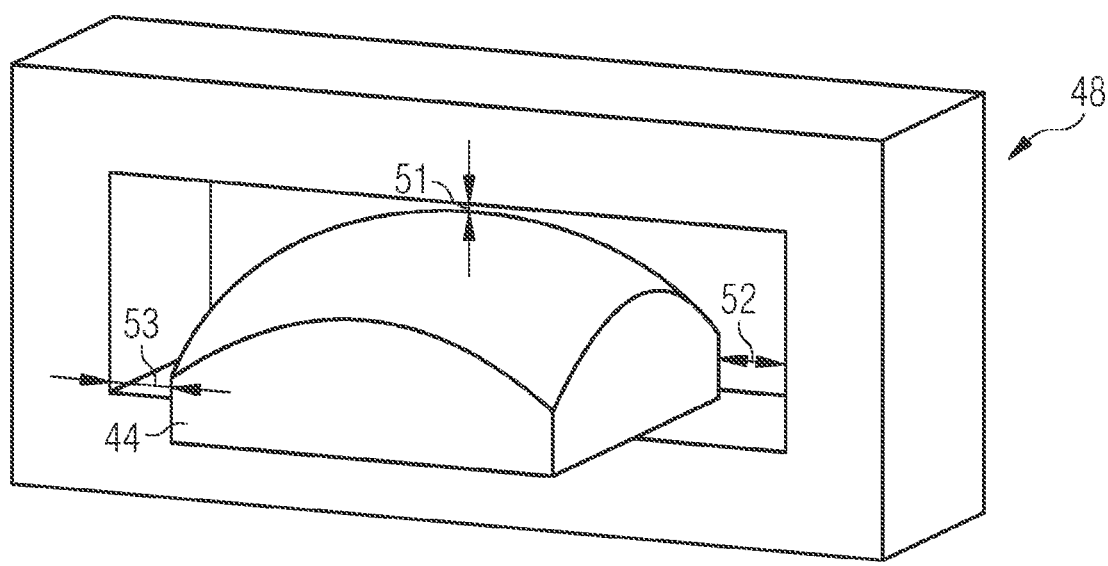
FIG. 17 illustrates the model of FIG. 16, in which the parts have been resized.

FIGS. 14 to 17 are practical examples of controlling thickness of a part by specifying the distance between a mesh face and a planar face. FIG. 14 illustrates another hybrid part 43 and FIG. 15 illustrates the same hybrid part, but a thinner version 44. This may arise, for example, where a part needs to be made thicker to meet specified strength requirements. The hybrid part 43 of FIG. 14 is designed as part of an assembly 45, shown in FIG. 16, where the hybrid part 43 is required to fit into an opening 46 in the assembly. The requirement may be to fit the hybrid part 43 exactly within the opening, in which case a touching constraint with the plane of the sides of the opening 46 may be used, or the hybrid part 43 may be required to fit into the opening 46, with a certain clearance, or gap 51, 52, 53 between the part 43 and the planes on each of the sides 47, 48, 49, 50 of the opening 46, in which case a dimension, such as illustrated by FIG. 10, would be used to maintain those clearances. Having defined the gap into which the hybrid part must fit and the clearances 51, 52, 53, the assembly may be resized 48, as shown in FIG. 17, whilst still maintaining the same clearances 51, 52, 53.

The above describes how constraints and dimensions to mesh surfaces are defined. The following paragraphs describe the method used to change the model from an initial state where the constraints are not solved to a final state where the constraints are solved.

The method of solution depends on defining two values for each constraint between a mesh and another geometry that is to be solved. Firstly, the distance between the mesh and the other geometry and secondly the first derivative vector of the distance between the mesh and the other geometry. The definition of these values depends on whether the geometries touch, intersect or neither.

If the global minimum distance between a mesh and any other geometry is greater than zero the geometries do not intersect or touch. The distance is taken to be the global minimum distance and the first derivative vector of the distance is the unit vector between the nearpoints on the two geometries.

If the global minimum distance is zero the geometries either intersect or touch. Two geometries touch if the global minimum distance between them is zero but it is possible to find a vanishingly small change of position or shape of the geometries which leads to a non-zero minimum distance. If the geometries touch then the distance is zero and the first derivative vector of the distance is a unit vector normal to the mesh geometry at the touching point. Two geometries intersect if the global minimum distance between them remains zero for every vanishingly small change of position or shape of the geometries. If the geometries intersect the distance is taken to be the length of the shortest relative translation vector such that the geometries touch, but do not intersect and the first derivative vector is a unit vector with the same direction as this translation vector.

Given the values of the distance the first derivative vector of the distance for each constraint it is possible to use these to find a solution. For example, for a coincident constraint between a point and a mesh, where the point does not initially lie on the mesh, it is possible to find the solution by moving the point in the direction of the first derivative vector by the value of the distance. A similar method can be used for a touching constraint between a plane and a mesh. For a distance dimension the geometry should be moved by an amount equal to the numerical difference between the value of the dimension and the distance.

In summary, in the present disclosure, a constraint to a mesh treats the mesh as an exact surface, so if the mesh is made up of facets, a constraint will measure to a facet interior (typically a plane), a facet boundary (typically a line) or a face corner (a point). The mesh is not approximated (e.g. by fitting a NURBS surface to it).

It is possible to find localised solutions to the mesh by specifying a sub-region of the mesh. One way of doing this is to specify a sphere (a point and radius). Only those parts of the mesh which lie inside the sphere will be considered for the purpose of finding the minimum distance. As well as allowing different solutions compared to finding the global minimum, this will also improve the performance by reducing the effective size of the mesh.

A mesh is not restricted to planar facets. For example, a mesh could be the entire boundary of a solid part made up of faceted faces, planar faces and other algebraic geometry faces. The distance and the first derivative of the distance are important because the distance and first derivative are all that is required for efficient constraint solving. The method has the benefit of generality, in that it can be applied to any type of mesh, such as a B-rep part with any face geometry. The definition of the distance and the surface normal leads to a stable solution with good convergence.

Figure 18:
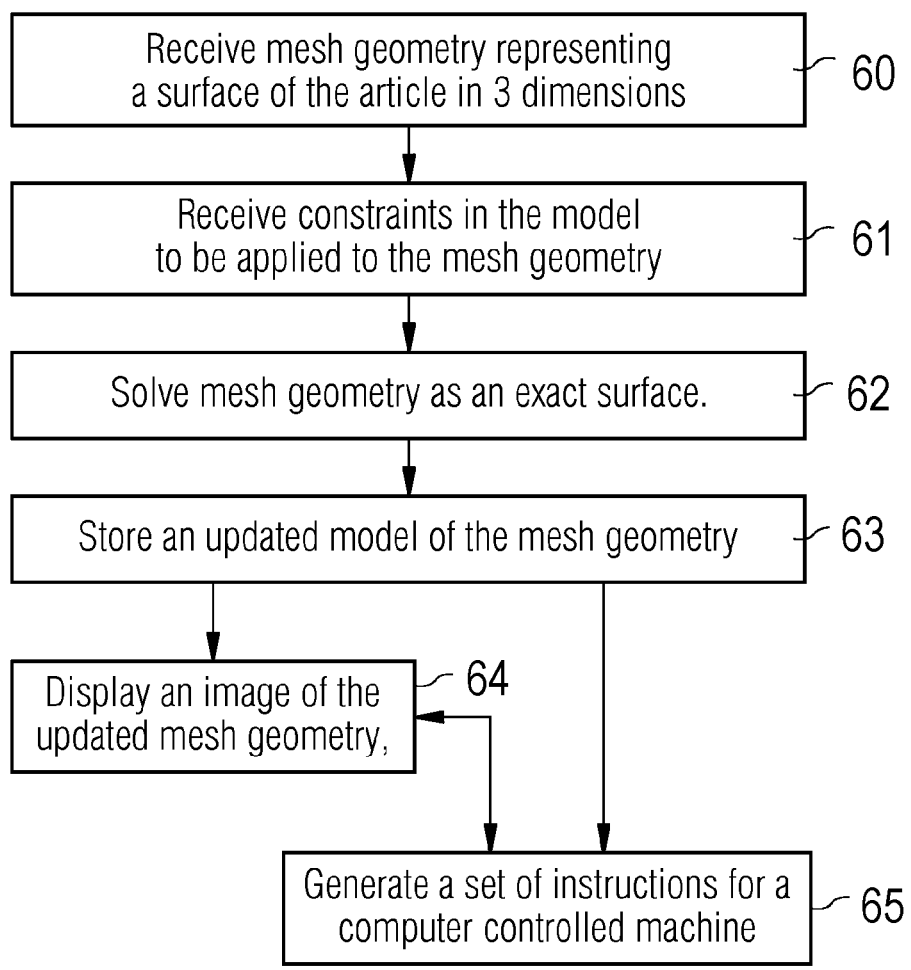
FIG. 18 is a flow diagram of a method of modifying a model in accordance with the disclosed embodiments.

FIG. 18 shows a flow diagram of an example of a method according to the present disclosure. A mesh geometry representing a surface of the article in 3 dimensions is received 60 in a CAD system model capable of representing an article as either algebraic geometry or facet geometry. Constraints to be applied to the mesh geometry are received 61 in the model. There are many different constraints, but one example is if the geometries do not intersect or touch, defining for each constraint the distance between a mesh geometry and any other geometry to be the global minimum distance between the mesh geometry and the other geometry; determining the vector from the nearpoint on the mesh geometry to the nearpoint on the other geometry; and, generating a unit vector from the direction of this vector and using this as the first derivative vector of the distance. Another example is if the geometries touch but do not intersect, for each constraint the distance between the mesh geometry and the other geometry is zero and the first derivative vector of the distance is a unit vector normal to the mesh geometry at the touching point. A third example is if the geometries intersect but do not touch, for each constraint the distance is the length of the shortest relative translation vector such that the geometries touch but do not intersect and the first derivative vector is a unit vector with the same direction as this translation vector.

In the method of the present disclosure, the mesh geometry is solved 62 as an exact surface. The solving step may comprise satisfying the received constraints by defining a solved position for each constraint and determining for each constraint a distance from that solved position and a first derivative vector of the distance for each constraint applied to the mesh geometry; and applying a change based on the determined distance and first derivative vector of the distance. An updated model of the mesh geometry is stored 63. The stored updated model may be used to display 64 an image of the updated mesh geometry, or to generate 65 a set of instructions for a computer controlled machine, or both. The user may wish to use the displayed image to check whether the modifications have had the effect intended, for example by analysing the mechanical properties of the part as designed. If the user determines that further modifications are required, these may be carried out by repeating the modelling steps, for example with modified constraints and generating a new display and new manufacturing instructions. The generated manufacturing instructions may be provided to a computer controlled machine and a part of a product, or a complete product, as modelled by the method of the disclosure, may be manufacutured using the instructions.

Using the method of the present disclosure, an aircraft or vehicle design may be improved and hence performance of the the aircraft or vehicle is improvised, in particular, by reducing the weight of parts whilst maintaining the same strength as a conventional design part.

An operating system included in the data processing system enables an output from the system to be displayed to the user on display 6 and the user to interact with the system. Examples of operating systems that may be used in a data processing system may include Microsoft Windows™, Linux™, UNIX™, iOS™, and Android™ operating systems.

In addition, it should be appreciated that data processing system 1 may be implemented as in a networked environment, distributed system environment, virtual machines in a virtual machine architecture, and/or cloud environment. For example, the processor 2 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system 1 may vary for particular implementations. For example the data processing system 1 in this example may correspond to a computer, workstation, and/or a server. However, it should be appreciated that alternative embodiments of a data processing system may be configured with corresponding or alternative components such as in the form of a mobile phone, tablet, controller board or any other system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

The data processing system 1 may be connected to the network (not a part of data processing system 1), which can be any public or private data processing system network or combination of networks, as known to those of skill in the art, including the Internet. Data processing system 1 can communicate over the network with one or more other data processing systems such as a server (also not part of the data processing system 1). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

The invention claimed is:

1. A method of operating a computer aided design (CAD) system model for an article to be designed or manufactured, the method performed on a data processing system; the method comprising:

in a CAD system model representing an article as a combination of algebraic and facet geometry, receiving a mesh geometry representing a surface of the article in 3 dimensions;

receiving constraints in the CAD system model to be applied to the mesh geometry, solving the mesh geometry as an exact surface based on the following:

satisfying the received constraints by defining a solved position for each constraint and determining for each constraint a distance from that solved position and a first derivative vector of the distance for each constraint applied to the mesh geometry, with respective values of the distance and the first derivative vector for each constraint being based on whether geometries touch, intersect or neither; and applying a change based on the determined distance and first derivative vector of the distance;

updating the CAD system model of the mesh geometry as an exact surface;

generating a set of instructions for manufacturing the article based on the updated CAD system model; and controlling a computer controlled machine for manufacturing the article based on the generated set of instructions.

2. The method according to claim 1, the method further comprising:

displaying an image of the updated mesh geometry.

3. The method according to claim 1, wherein the constraints comprise at least one of a geometry coincident to the mesh geometry; a distance dimension between a geometry and the mesh geometry; or a geometry touching the mesh geometry.

4. The method according to claim 1, further comprising:

when the geometries do not intersect or touch:

defining for each constraint the distance between a mesh geometry and any other geometry to be a global minimum distance between the mesh geometry and the other geometry;

determining a vector from a nearpoint on the mesh geometry to a nearpoint on the other geometry; and, generating a unit vector from a direction of the determined vector and using the unit vector as the first derivative vector of the distance.

5. The method according to claim 1, further comprising:

when the geometries touch but do not intersect:

for each constraint the distance between the mesh geometry and the other geometry is zero and the first derivative vector of the distance is a unit vector normal to the mesh geometry at the touching point.

6. The method according to claim 1, further comprising:

when the geometries intersect but do not touch:

for each constraint the distance is a length of a shortest relative translation vector such that the geometries touch but do not intersect and the first derivative vector is a unit vector having a same direction as the relative translation vector.

7. The method according to claim 1, the method further comprising:

selecting a sub-region of the received mesh geometry and performing the distance and first derivative calculations for the sub-region.

8. The method according to claim 7, wherein the sub-region comprises one of that part of the received mesh geometry that lies within a sphere defined by a specified radius about a specified point; that lies within a rectangular box of a specified size and location; that lies within a region identified by an end-user sketching a closed loop on the mesh; that lies within a region of the mesh which is smooth; or that lies within a region that is bounded by edges.

9. The method according to claim 1, wherein the geometry comprises one of a point, a curve, an algebraic surface, a facet surface, or a mesh geometry.

10. The method according to claim 1, wherein the constraints are applicable between a point, a curve, an algebraic surface, a facet surface, another mesh geometry, and the received mesh geometry.

11. The method according to claim 1, wherein the mesh geometry comprises one or more points, curves, algebraic surfaces, or facet surfaces, or combinations thereof.

12. The method according to claim 1, wherein the constraints may be received from an external source, extracted from a store, or inferred from the geometry in the CAD system model.

13. The method according to claim 1, wherein the method is an iterative method.

14. A method of manufacturing a part, the method comprising:

modelling the part in accordance with claim 1;

inputting the updated mesh geometry to a computer controlled machine; and replicating an associated article in a material using the computer controlled machine.

15. A data processing system, comprising:

a processor; and an accessible memory, wherein the data processing system is configured to carry out the steps of:

in a CAD system model representing an article as a combination of algebraic and facet geometry, receiving a mesh geometry representing a surface of the article in 3 dimensions;

receiving constraints in the CAD system model to be applied to the mesh geometry, solving the mesh geometry as an exact surface based on the following:

satisfying the received constraints by defining a solved position for each constraint and determining for each constraint a distance from that solved position and a first derivative vector of the distance for each constraint applied to the mesh geometry, with respective values of the distance and the first derivative vector for each constraint being based on whether geometries touch, intersect or neither; and applying a change based on the determined distance and first derivative vector of the distance;

updating the CAD system model of the mesh geometry as an exact surface;

generating a set of instructions for manufacturing the article based on the updated CAD system model; and controlling a computer controlled machine for manufacturing the article based on the generated set of instructions.

16. A non-transitory computer-readable medium encoded with executable instructions that, when executed, cause one or more data processing systems to perform a method of modifying a computer aided design (CAD) system model, the method performed on a data processing system, the method comprising:

in a CAD system model capable of representing an article as a combination of algebraic and facet geometry, receiving a mesh geometry representing a surface of the article in 3 dimensions;

receiving constraints in the CAD system model to be applied to the mesh geometry, solving the mesh geometry as an exact surface based on the following:

satisfying the received constraints by defining a solved position for each constraint and determining for each constraint a distance from that solved position and a first derivative vector of the distance for each constraint applied to the mesh geometry, with respective values of the distance and the first derivative vector for each constraint being based on whether geometries touch, intersect or neither; and applying a change based on the determined distance and first derivative vector of the distance;

updating the CAD system model of the mesh geometry as an exact surface;

generating a set of instructions for manufacturing the article based on the updated CAD system model; and
controlling a computer controlled machine for manufacturing the article based on the generated set of instructions.

* * * * *